June 26, 1962 R. GERR 3,041,541

CLIPPER HAVING INDEPENDENT CONTROLS FOR SETTING INPUT CLIPPING LEVEL AND DIRECT VOLTAGE LEVEL OF RESULTING OUTPUT

Filed Aug. 3, 1959

INVENTOR.
RAYMOND GERR
BY
Laurence S. Epstein
ATTORNEYS.

3,041,541

CLIPPER HAVING INDEPENDENT CONTROLS FOR SETTING INPUT CLIPPING LEVEL AND DIRECT VOLTAGE LEVEL OF RESULTING OUTPUT

Raymond Gerr, New York, N.Y., assignor, by mesne assignments, to the United States of America as represented by the Secretary of the Navy

Filed Aug. 3, 1959, Ser. No. 831,448
7 Claims. (Cl. 328—31)

This invention relates to a voltage amplitude limiter and clipper circuit and is directed particularly to a balanced clipper circuit.

One of the problems encountered in analogue computers is to determine accurately the zero intercept of a sinusoidal wave form. To accomplish this, the usual practice is to clip and amplify a sinusoidal wave several times, thereby producing a square wave whose edges mark the zero intercept points of the original waves. Zero intercept point errors arise from two properties inherent in the alternate clipping and amplifying process. The first source of errors occurs from the fact that the zero axis of an unbalanced alternating wave form shifts to the average value after an R-C coupling network. If unbalanced clipping occurs early in the clipping amplifying chain, large errors are produced.

The second source of error results from the fact that if the sine wave signal is introduced to a diode or a grid clipper through an R-C coupling network, a charge is built up on the capacitor which changes the effective operating point of the clipping tube and introduces a corresponding error.

Both sources of error are proportioned to the amplitude of the sine wave. When variable amplitudes are involved very large errors are introduced. The present invention eliminates the above sources of error and provides balanced clipping with no error in the zero intercept point for varying sine wave amplitudes. Previous methods used to obtain balanced clipping of sine wave voltages of varying amplitudes with no error in the zero intercept point included (1) diode clippers with D.C. coupling to the source, (2) grid clipping with D.C. coupling to the source, (3) grid clipping with capacitive coupling to the source and a balanced time constant circuit in the grid input, and (4) plate clipping.

The above mentioned methods have the following disadvantages which limit their accuracy and range of usefulness in analogue computer circuit applications. Methods (1) and (2) require low impedance sources and are subject to zero intercept point error caused by drift of the D.C. level in tube characteristic and power sources. Method (3) requires carefully matched diodes that are subject to temperature changes. Method (4) requires two amplifier states with attendant complexity. In addition, method (4) suffers from the disadvantage that the outputs are taken from the high impedance plate side of the tubes which tends to degrade the high frequency response of the clipper, thereby adversely affecting the rise time of the output.

The primary object of this invention is to provide an improved balanced clipper circuit for use with varying amplitude sine wave inputs.

Another object of the invention resides in the provision of means for presenting a very high impedance at its input terminals.

Another object of the invention resides in the provision of a balanced clipping circuit wherein the clipping level is not dependent on the magnitudes of applied operative voltages.

A further object of the invention resides in the provision of a balanced clipping circuit wherein the clipping level is independent of variations in supply voltages.

Yet a further object of the invention resides in the provision means for high frequency operating voltages in a limiting and clipper circuit.

Other objects and many of the attendant advantages of this invention will be readily appreciated as the same becomes better understood by reference to the following detailed description when considered in connection with the accompanying drawings wherein.

Figure 1:
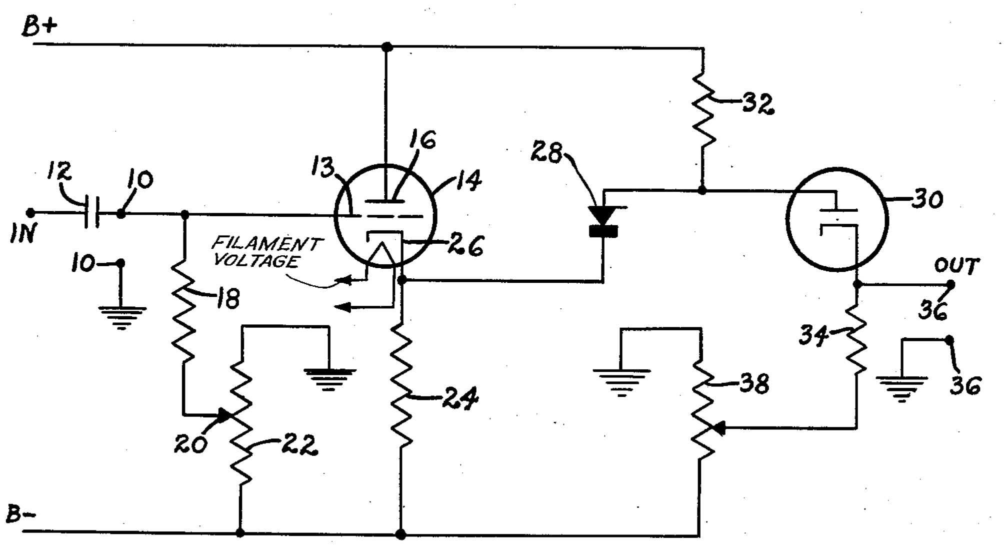
FIGURE 1 shows a schematic diagram of the limiter and clipper circuit.

Referring now to FIGURE 1, the input to the limiter and clipper circuit is shown at terminal 10 to which an input condenser 12 may be attached to isolate the circuit from preceding apparatus. The ungrounded terminal 10 is connected to the grid 13 of the triode 14. The triode 14 operates as a cathode follower with its plate 16 supplied with direct current of positive polarity from the B+ terminal which is supplied with power from a suitable source such as a battery, not shown. The ungrounded terminal 10 is also connected to the grid load resistor 18 which is connected between the grid 13 of the triode 14 and the variable contact 20 of variable resistor 22. The resistive portion of the bias resistor 22 is connected between ground and the B— terminal which is supplied with a source of negative potential. The position of the movable contact of variable resistor 22 is adjusted to supply a specific bias voltage to the grid of triode 14 to place this tube at the desired operating point.

The cathode load resistor 24 for triode 14 is connected between the cathode 26 of this tube and the B— terminal. The cathode 26 is also connected to the cathode of the first diode 28. The anodes of the first diode 28 and the second diode 30 are connected to one side of load resistor 32. The other side of load resistor 32 is connected to the B+ terminal. The cathode of the second diode 30 is connected to one side of resistor 34 and to the output terminals 36. The other side of resistor 34 is connected to the variable contact of bias resistor 38. The resistive portion of bias resistor 38 is connected between ground and the B— terminal.

In operation an input sine wave which is to be clipped is applied to the grid 13 of the tube 14 through condenser 12. With no input signal, tube 28 is conducting and maintains the cathode 26 of the tube 14 at a level which is determined by the values of resistor 24 and the bias voltage on the grid 13 as determined by resistor 22. The first and second diodes 28 and 30 are also conducting with no input signal applied to the grid of the triode cathode follower tube 14. Variable resistor 38 is adjusted so that the bias voltage applied to the second diode load resistor 34 is such that the voltage on the anodes of the first and second diodes is sufficiently positive to permit the first diode 28 to conduct with no input signal at the grid of the triode cathode follower 14.

When a positive going input signal is applied to the grid of the triode 14, the cathode 26 goes positive because of the cathode follower action thereby decreasing the current through the first diode 28, thus increasing the potential at the anodes of the diodes. An increase in the anode potential of second diode 30 causes an increase in the cathode potential and thereby results in a positive going output at the output terminal 36. Thus, the output follows the input for positive going signals. When the positive going input signal reaches a level which raises the potential at the cathode 26 to a point at which first diode 28 ceases to conduct, the positive going output signal remains constant at this level and isolated from the input by said first diode 28 regardless of the magnitude of the input signal. Although large positive going input signals may distort the waveshape appearing at the cathode 26, this has no effect on the output because of the isolation provided by the cutoff first diode 28.

Figure 2:
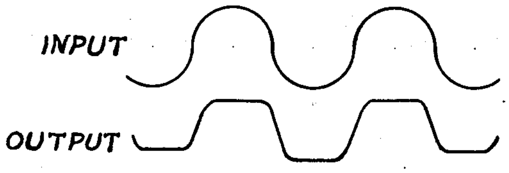
FIGURE 2 is a graph of clipper action.

When the input sine wave starts to go negative, the first diode 28 does not conduct until the potential at the cathode 26 is reduced to the cutoff point for the first diode 28, i.e., the voltage at which the first diode 28 ceased to conduct when the input was going positive. When the first diode 28 conducts, the output at terminals 36 is connected to the potential at the cathode 26. As the potential at the cathode 26 decreases, the first diode 28 conducts more and more heavily causing the potential at the anodes of the diodes to decrease. This decrease in anode potential causes second diode 30 to draw less and less current as the anode potential decreases, resulting in a decreasing voltage at the output terminals 36 which follows the decreasing input sine wave at the grid 13 of the triode 14. When the potential at the anodes of the diodes falls to a point at which the second diode 30 ceases to conduct, the negative going output signal remains constant at this level and isolated from the input by said second diode 30 regardless of the negative magnitude of the input signal. Although large negative going input signals may cut off the triode 14 and thereby distort the waveshape appearing at the cathode 26, this has no effect on the output because of the isolation provided by the cutoff second diode 30. The bias potentiometers 22 and 38 are adjusted to provide a balanced clipped output, as shown in FIGURE 2, for a sine wave output to the triode tube 14.

Obviously many modifications and variations of the present invention are possible in the light of the above teachings. It is therefore to be understood that within the scope of the appended claims the invention may be practiced otherwise than as specifically described.

What is claimed is:

1. A clipping circuit comprising an amplifier tube having a grid, a plate and a cathode, a grid load resistor and an output load resistor respectively connected to said tube, energy supply means comprising a positive B voltage supply and a negative B voltage supply connected to said tube, said positive B voltage supply connected to the plate of said tube, a first asymmetric conductor having one terminal connected to the plates of said tube, a second asymmetric conductor connected to the other terminal of said first asymmetric conductor, a resistor connected at one end to the interconnecting point for said first and second asymmetric conductors and connected at its other end to said positive B voltage supply, an output load resistor connected at one end to the free end of said second asymmetric conductor and at its other end to means which are connected to said negative B voltage and supply a variable biasing voltage for said output resistor, said negative B voltage connected to adjustable bias means which are connected to the grid load of said amplifier tube supplying bias voltage thereto, whereby a balanced, clipped, alternating current output is produced at said output resistor when an alternating current input is applied to the grid of said amplifier tube.

2. The combination of claim 1 wherein said asymmetric conductors are crystal diodes.

3. The combination of claim 2 wherein said adjustable bias voltage means are potentiometers, said potentiometers being connected between the negative B supply voltage and ground potential.

4. A clamping circuit, having an input and an output and comprising amplifying means having input, output and control means, said amplifying means being connected to said clamping circuit input, energy supply means operatively connected to said amplifying means for operation thereof, a first asymmetric conductor having input and output means, the input of said first asymmetric conductor being operatively connected to the output of said amplifying means, a second asymmetric conductor having input and output means, the output of said second asymmetric conductor being operatively connected to the output of said first asymmetrical conductor, and said clamping circuit output being connected to said second asymmetric conductor, whereby sine waves applied to the control means of said amplifier means produce an undistorted clamped sine wave at said clamping circuit output means.

5. The combination of claim 4 and first control means connected to said amplifier means for adjustment of the operating characteristics thereof, and second control means connected to said second asymmetric conductor for adjustment of the operating characteristics thereof, whereby said first and second control means are utilized to adjust the magnitude of the clamped output.

6. The combination of claim 5 wherein said amplifier means comprise a triode vacuum tube connected as a cathode follower and a cathode load resistor.

7. The combination of claim 6 wherein said first and second asymmetric conductors are crystal diodes.

References Cited in the file of this patent

UNITED STATES PATENTS

| | | |
|---|---|---|
| 2,550,715 | Norton | May 1, 1951 |
| 2,683,806 | Moody | July 13, 1954 |
| 2,828,417 | Fleming et al. | Mar. 25, 1958 |

OTHER REFERENCES

Electronic Analog Computers—Korn & Korn, 2nd Edition, McGraw-Hill Book Co., Inc. 1956.

Pulse and Digital Computers—Millman & Taub, McGraw-Hill Book Co., Inc. 1956.